ANTI-LOCK BRAKE SYSTEM WITH WHEEL SPEED COMPARATOR

United States Patent
Green

[15] 3,687,242
[45] Aug. 29, 1972

| | | | |
|---|---|---|---|
| [54] | ANTI-LOCK BRAKE SYSTEM WITH WHEEL SPEED COMPARATOR | | |
| [72] | Inventor: | Raymond J. Green, Northville, Mich. | |
| [73] | Assignee: | General Motors Corporation, Detroit, Mich. | |
| [22] | Filed: | March 8, 1971 | |
| [21] | Appl. No.: | 121,721 | |
| [52] | U.S. Cl. | 188/181 C, 303/21 EB | |
| [51] | Int. Cl. | B60t 8/04 | |
| [58] | Field of Search | 303/21; 188/181 | |

[56] References Cited

UNITED STATES PATENTS

| | | | |
|---|---|---|---|
| 2,038,148 | 4/1936 | Cook et al. | 188/181 C |
| 3,288,232 | 11/1966 | Shepherd | 303/21 EB |
| 3,574,415 | 4/1971 | Stamm | 303/21 EB |

*Primary Examiner*—Milton Buchler
*Assistant Examiner*—John J. McLaughlin
*Attorney*—W. E. Finken and D. D. McGraw

[57] ABSTRACT

A vehicle anti-lock brake system wherein a suitable prior art device is used to provide anti-lock control for the rear vehicle wheels and a mechanical wheel speed comparator functions to control a brake pressure modulator associated with the front wheels so that the front wheels are permitted to go slower than the rear controlled wheels by only a certain predetermined amount.

3 Claims, 4 Drawing Figures

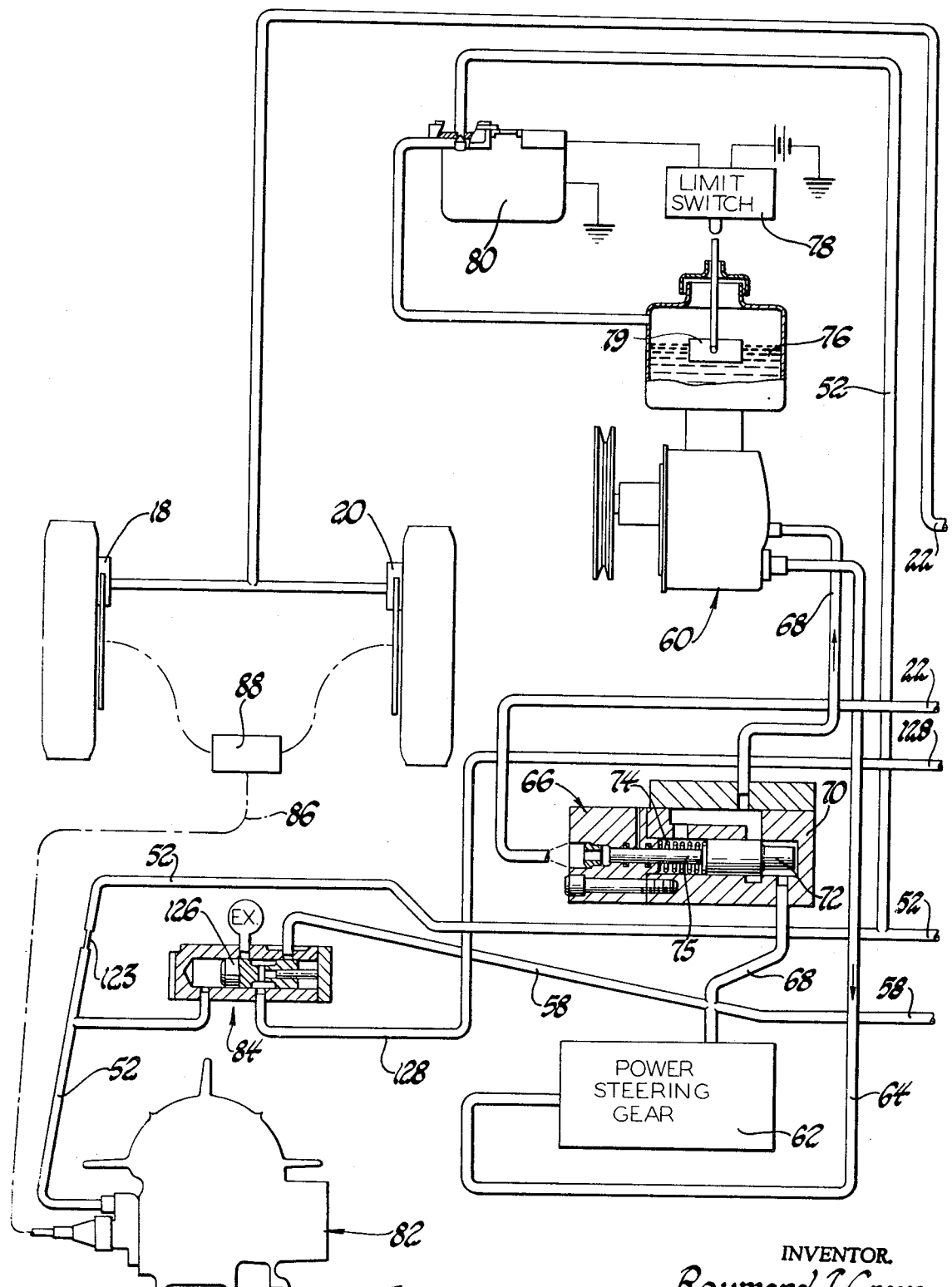

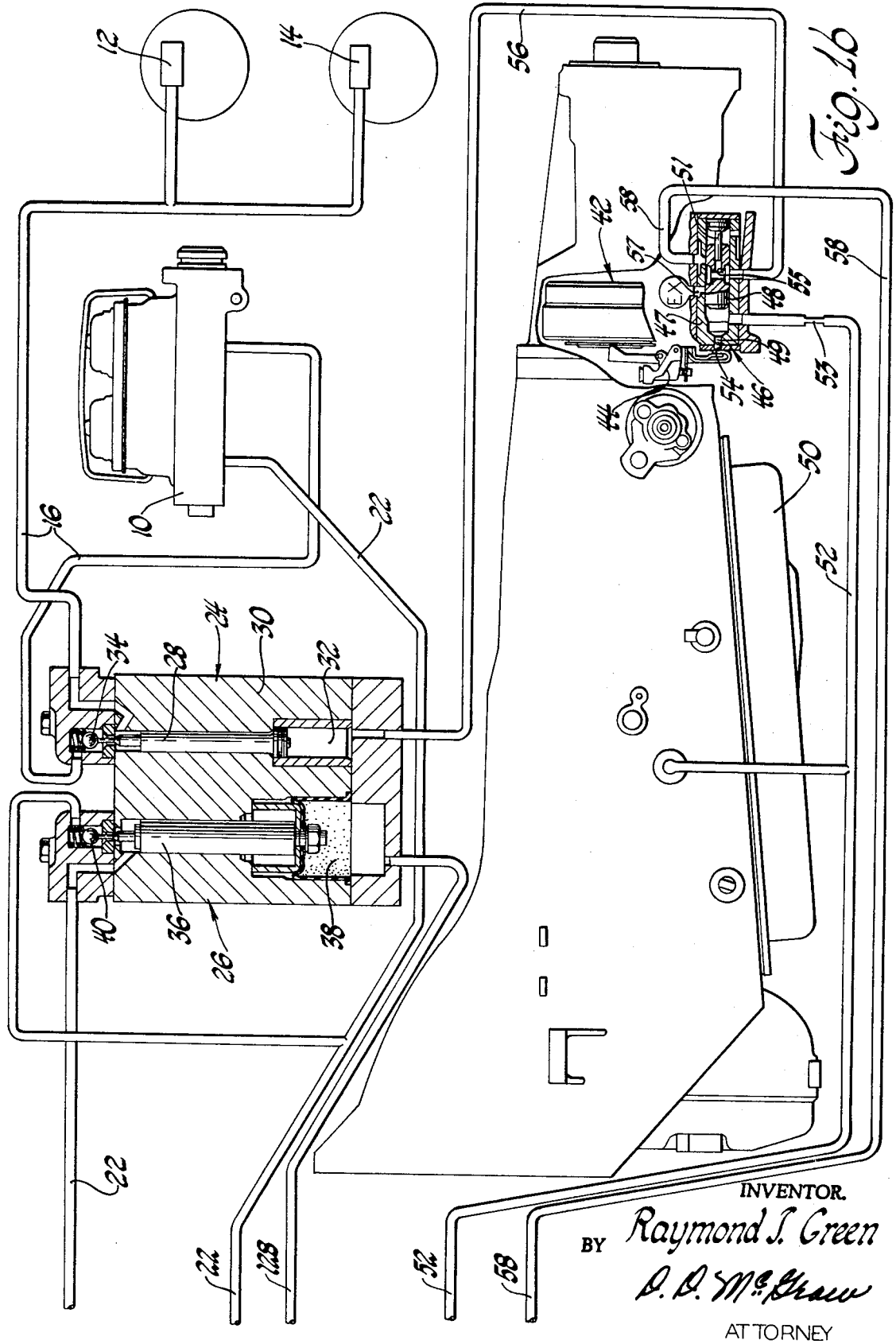

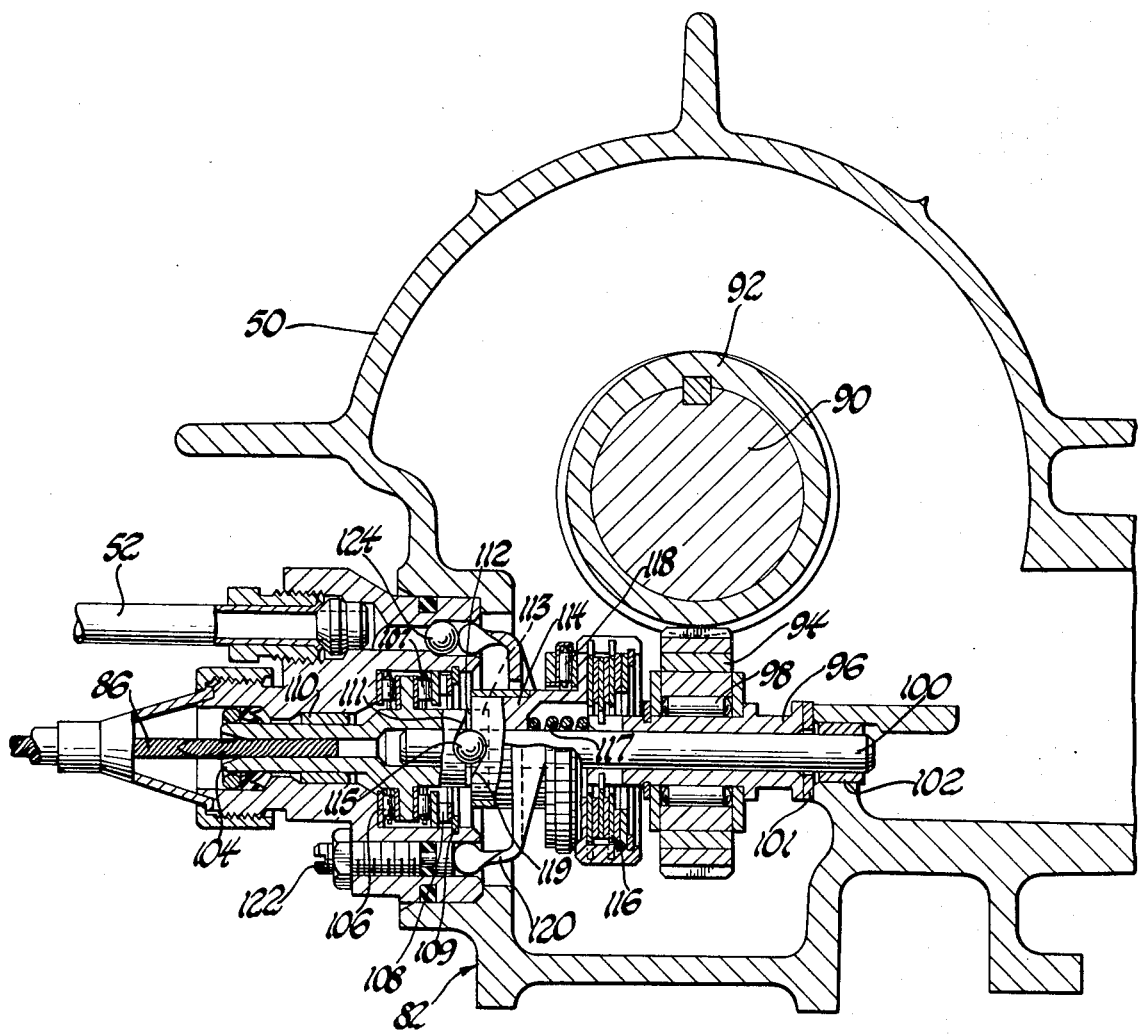

ANTI-LOCK BRAKE SYSTEM WITH WHEEL SPEED COMPARATOR

This invention relates to a vehicle brake anti-lock system and more particularly to a brake anti-lock system having a wheel speed comparator which controls an anti-lock modulator for one pair of wheels using another pair of controlled wheels as a base.

It is well known that the braking pressure applied to a fluid pressure operated wheel brake can be increased to such an extent that braking effectiveness is decreased. This decreased braking effectiveness occurs when the wheel slip approaches the locked wheel condition in which the vehicle wheel is no longer rotating and may be evidenced in increased stopping distances. Consequent with wheel sliding, the tire-to-road lateral force capability is also reduced having an adverse effect on vehicle steerability. It is, therefore, desirable to control the brake apply pressure in accordance with the acceleration and deceleration characteristics of the wheel or wheels being braked.

The prior art teaches the practice of providing a brake pressure modulator intermediate the brake pressure source and the controlled vehicle wheel. The brake pressure modulator is typically controlled by electronic or inertia type acceleration sensors to selectively release and reapply the brake pressure in such a manner as to limit wheel slip. Such a brake pressure control system may be associated with only the vehicle rear wheels, resulting in improved vehicle directional stability and braking performance. However, anti-lock control of the front wheels in addition to the rear wheels is desirable from the standpoint of improved vehicle steering control inasmuch as the lateral force capability of the front wheels is impaired by wheel lock.

The present invention contemplates the use of one of the aforementioned acceleration sensing means to control a brake pressure modulator associated with the rear wheel brakes of a conventional vehicle having driven rear wheels and steering front wheels. The invention provides a mechanical wheel speed comparator which, using the rear wheels as a base, controls a brake pressure modulator associated with the front wheel brakes so that the front wheels are permitted to go slower than the controlled rear wheels by only a certain predetermined amount.

In the drawings:

The composite of FIGS. 1a and 1b is a schematic illustration of a brake system embodying the invention and having parts broken away and in section;

FIG. 2 is a sectional view of the wheel speed comparator of this invention; and

FIG. 3 illustrates the assembly of FIGS. 1a and 1b.

GENERAL SYSTEM COMPONENTS AND OPERATION

Referring to the composite of FIGS. 1a and 1b, the vehicle braking system includes a dual chamber master cylinder 10 which is actuable by a power booster (not shown) to communicate pressurized braking fluid at pressures of as much as 2,000 psi to the rear wheel brakes 12 and 14 through conduit 16 and to the front wheel brakes 18 and 20 through conduit 22. A brake pressure modulator 24 is interposed in conduit 16 intermediate master cylinder 10 and rear wheel brakes 12 and 14 so that it can modify the brake pressure communicated to the rear wheel brakes 12 and 14. Likewise, the brake pressure modulator 26 is located in conduit 22 intermediate master cylinder 10 and the front wheel brakes 18 and 20. The rear wheel brake pressure modulator 24 is of the conventional sort well known in the prior art and includes piston 28 which is reciprocably mounted in modulator housing 30. Piston 28 is movable in housing 30 in response to pressure variations in fluid pressure chamber 32 to cyclically reduce and reapply the brake pressure in conduit 16. FIG. 1b shown piston 28 positioned during normal braking wherein the fluid pressure in chamber 32 urges piston 28 into unseating engagement of ball check valve 34 against the opposing force of the brake fluid pressure acting on the other end of piston 28 so as to permit free brake fluid communication between master cylinder 10 and the controlled rear wheel brakes 12 and 14. The front brake pressure modulator 26 is similar in construction and operation to the aforedescribed rear brake pressure modulator 24 and includes piston 36, fluid pressure chamber 38, and ball check valve 40.

The rear brake pressure modulator 24 is operated by the inertia type deceleration sensor indicated generally at 42. This type of anti-lock control sensor is disclosed in detail in U.S. Patent application Ser. No. 121,720 entitled "Fully Compensated Brake Anti-Lock Sensor," filed in the name of Erkki A. Koivunen on even date herewith and assigned to the common assignee. In simplest terms, the inertia type deceleration sensor 42 includes a transmission output shaft driven rotary inertia weight which upon rapid deceleration of the transmission output shaft resulting from impending rear wheel lock moves axially through a ball and ramp arrangement to operate lever mechanism 44.

A rear modulator control valve, indicated generally at 46, includes a valve spool 48 which is shown in FIG. 1b in its position in housing 47 corresponding to normal braking. Conduit 52 communicates the transmission line pressure from the transmission pump of automatic transmission 50 to the rear modulator control valve 46 where it acts on the leftward end of valve spool 48. Conduit 56 connects modulator control valve 46 with pressure chamber 32 of rear modulator 24 and communicates the modulator supporting pressure to chamber 55 of valve spool 48 where it acts leftwardly on the differential area of valve spool 48 resulting from pin 51 which extends from the valve housing 47. The lands of valve spool 48 are spaced so as to simultaneously block fluid communication between conduit 56 and both the exhaust port 57 and the pressure supply conduit 58 when the spool is in the centered position shown in FIG. 1b. The rear modulator control valve 46 may be characterized as a pressure regulating valve inasmuch as it functions to selectively connect the conduit 56 with either the exhaust port 57 or the pressure supply conduit 58 and thereby regulate the modulator supporting pressure in conduit 56 in proportion to the transmission line pressure in conduit 52. The rear modulator control valve 46 also includes a ball valve 54 which is attached to lever mechanism 44 and is normally seated on housing 47 blocking exhaust port 49 to hold the transmission line pressure acting on the left end of spool 48. When the deceleration sensor 42 actuates lever mechanism 44 the ball valve 54 is unseated, thereby bleeding transmission line pressure to the transmission fluid reservoir. The resulting unbalanced leftward acting force of the modulator supporting pressure in chamber 55 then moves valve spool 48 leftwardly opening fluid communication between conduit 56 and the exhaust port 57. The resulting loss of fluid pressure in fluid pressure chamber 32 permits movement of piston 28 by the brake fluid pressure acting on the upper end thereof to sequentially seat ball check valve 34, isolating the rear wheel brakes 12 and 14 from master cylinder 10, and withdraw brake fluid from the wheel brakes 12 and 14. An orifice 53 is provided in conduit 56 so that the transmission line pressure is not adversely affected by the unseating of ball valve 54.

When the impending wheel lock condition has been arrested, the deceleration sensor 42 operates through lever mechanism 44 to seat ball valve 54. Seating of ball valve 54 allows the transmission line fluid, metered through orifice 53, to build up pressure and move valve spool 48 to a position rightward of center wherein fluid communication is established between conduit 56 and conduit 58. Owing to the fact that modulator piston 28 must be returned to its normal position very rapidly in order to provide the necessary system response and that the standard production automatic transmission pump is not capable of providing the necessary fluid pressure and flow to reapply both the front and rear modulators simultaneously, particularly if the vehicle is equipped with disc brakes, a suitable source of high fluid pressure and flow must be used to reapply the brakes. In this particular system, the power steering pump 60 serves as the brake apply pressure source. The typical power steering pump 60 provides operating fluid at up to 1,200 psi, for example, to the power steering gear 62 through conduit 64. A pressure regulator valve generally indicated at 66, is interposed in the steering fluid return line 68 and serves to maintain a steering fluid pressure which is proportional to brake fluid pressure. Pressure regulator valve 66 includes a housing 70 in which valve member 72 is slidable to control fluid flow from the power steering gear 62 to the reservoir of power steering pump 60. Valve member 72 is biased in the flow restricting direction by spring 74 which is sized to maintain a steering fluid pressure upstream of the pressure regulator valve which is just sufficient to hold the modulator piston 28 in its normal position when the brakes are not applied. A plunger 75 is sealingly slidable in housing 70 and is acted upon by the brake fluid pressure in conduit 22. When the brake fluid pressure is increased by operator actuation of master cylinder 10, the brake fluid pressure acts on valve member 72 through plunger 75 to urge the valve member 72 in the flow restricting direction and thus proportionally increase the steering fluid pressure. In this manner the steering fluid pressure tracks the brake fluid pressure whenever the brakes are applied. This brake pressure modulated steering fluid is communicated through conduit 58, control valve 46, and conduit 56 to fluid pressure chamber 32 where it acts to forcibly return piston 28 to its normal position whereby the brake pressure is reapplied and the modulator piston 28 is held in its normal position against the opposing force of the brake pressure acting on the upper cross-section thereof. As the pressure in conduit 56 increases, the leftward acting force on valve spool 48 increases and the spool moves leftwardly to the balanced center position of FIG. 1b.

Inasmuch as the steering fluid flows from the power steering circuit to the automatic transmission circuit during the brake apply mode of anti-lock operation, it is necessary to provide some means of replenishing the supply of power steering fluid. The power steering pump 60 has been provided with an auxiliary reservoir 76. A fluid level controller including a limit switch 78, which is actuated by a float 79, closes an electrical circuit when the fluid level in the auxiliary reservoir 76 falls. Actuation of the limit switch 78 completes an electrical circuit which opens solenoid valve 80 allowing communication of transmission line fluid from conduit 52 to the auxiliary reservoir 76. When the fluid level in auxiliary reservoir 76 has risen sufficiently to open the limit switch 78, the electrical circuit is deenergized closing valve 80. Solenoid valve 80 meters fluid from the transmission line 52 at a very slow rate so that the transmission line pressure is not appreciably affected. Thus rear wheel anti-lock control is provided.

WHEEL SPEED COMPARATOR DESCRIPTION AND OPERATION

The wheel speed comparator, indicated generally at 82 in FIG. 1a and shown in detail in FIG. 3, uses the controlled rear wheels as a base from which the front wheels are controlled. Referring to the schematic illustration of FIG. 1a it can be seen that the wheel speed comparator 82, which will be described in detail hereinafter, operates a front modulator control valve, indicated generally at 84, in the same way that the deceleration sensor 42 operates the rear modulator control valve 46. The wheel speed comparator 82 is provided with a front wheel speed input through a wheel driven cable 86. Cable 86 is driven through a differential unit 88 so as to provide an average speed of the front wheels.

Referring now to the detail sectional view of the wheel speed comparator shown in FIG. 3, it can be seen that the wheel speed comparator is housed within the automatic transmission 50. The transmission output shaft 90 carries a gear 92. Gear 94 is driven by gear 92 and is in turn drivingly engageable with gear sleeve 96 through a one-way clutch 98, illustrated as being of the ramp and roller type. Gear sleeve 96 turns freely on shaft 100 which is rotatably mounted in the case of the automatic transmission 50 by bushing 102. Washer 101 prevents axial movement of gear sleeve 96. A cam sleeve 104 is rotatably supported by bushing 110 and is attached to shaft 100. The cam sleeve 104 is also rotatably caged between roller bearing assemblies 106 and 107 which are held axially stationary in the case of transmission 50 by a wavy spring 108 and a snap ring 109. The front wheel driven cable 86 has a square cross-sectional end which is inserted in a mating square hole in cam sleeve 104 to provide a driving connection therebetween. The cam sleeve 104 includes axially projecting tabs 112 which engage oversize circumferentially spaced slots 113 in a clutch housing 114. Clutch housing 114 is located axially intermediate cam sleeve 104 and gear sleeve 96 and is rotatably supported on shaft 100. Balls 115 are located intermediate cam sleeve 104 and clutch housing 114 and engage ramp surfaces 111 and 119 formed respectively thereon. Spring 117 acts between gear sleeve 96 and clutch housing 114 to hold clutch housing 114 close to cam sleeve 104 as determined by engagement of ramp surfaces 111 and 119 with balls 115. Clutch housing 114 mounts a disk clutch assembly, generally indicated at 116, which acts between clutch housing 114 and gear sleeve 96. The disk clutch assembly 116 is splined to gear sleeve 96 so as to permit relative axial movement between clutch housing 114 and gear sleeve 96. Thrust bearing assembly 118 is seated against the rotatable clutch housing 114 and is engaged by the nonrotatable valve lever 120 which has one end pivotally seated at adjusting screw 122 and the other end engaging ball valve 124.

In operation the wheel speed comparator 82 unseats ball valve 124 when the front wheel speed decreases to some predetermined amount less than the average speed of the rear wheels, thereby indicating a greater front wheel slip than rear wheel slip. The cable 86 and cam sleeve 104 are driven at the average front wheel speed through the differential unit 88. The tabs 112 of cam sleeve 104 engage the walls of slots 113 to drive clutch housing 114 at the average front wheel speed. The disk clutch assembly 116 acting between the clutch housing 114 and the gear sleeve 96 drives the gear sleeve 96 at the front wheel speed.

The ratio of gears 92 and 94 is selected to provide, during normal unbraked vehicle operation, a speed in gear 94 which is somewhat less than the rotating speed of cable 86. This is necessary to compensate for the effect of different rolling radii between the front and rear wheels which may result from the use of different size tires on the front and rear wheels, or similar vehicle operating variances. It is this predetermined difference between the front and rear wheel proportional speeds that determines the amount by which the front wheels will be allowed to go slower than the rear controlled wheels. The ratio of three revolutions of gear 94 to four revolutions of the cable 86 has been determined as a suitable ratio and as such will hereinafter be discussed as an appropriate example although it is realized that many other ratios may be used.

When the motor vehicle is being driven without braking or when the braking pressure applied to the rear wheels has not imparted sufficient braking force thereto to initiate anti-lock control of the rear wheel brakes 12 and 14, the cable 86, cam sleeve 104, clutch housing 114, and gear sleeve 96 are rotating at the front wheel speed while the one-way clutch 98 permits gear 94 to freewheel at three-quarters the speed of gear sleeve 96 on which it rotates. The application of the vehicle brakes up to the incipient skid condition causes the transmission output shaft driven gear 94 and the front wheel speed driven gear sleeve 96 to slow down. When excessive braking pressure has been generated in the master cylinder 10 and communicated to the rear wheel brakes 12 and 14 resulting in a brake effectiveness retarding increase in wheel slip, the deceleration sensor 42 initiates anti-lock control of the rear wheel brakes 12 and 14 as hereinbefore described. Since the rear wheels are not allowed to lock, it is assured that gear 94 will continue rotating until the vehicle has been brought to a stop. As the excessive braking force retards the rotation of the thus far uncontrolled front wheels, the cable 86 and attached cam sleeve 104 slow down. The front wheel speed is allowed to decrease, in this instance to three-quarters of the rear wheel speed, until the gear sleeve 96 tries to rotate slower than gear 94. One-way clutch 98 prevents gear sleeve 96 from rotating slower than gear 94. When the front wheels slow down to such an extent that gear 94 begins to drive gear sleeve 96 a driving torque is applied to clutch housing 114 through the disk clutch assembly 116. The oversize slots 113 by which the tabs 112 drive clutch housing 114 permit the driving torque to turn clutch housing 114 relative to the cam sleeve 104, causing clutch housing 114 to move axially rightwardly away from cam sleeve 104 through the action of the ball 115 on ramps 111 and 119. It is noted that the capacity of spring 117 determines the torque necessary to cause axial separation of the clutch housing 114 from the cam sleeve 104. As clutch housing 114 moves rightwardly, the transmission line pressure in conduit 52 urges ball 124, valve lever 120 and the thrust bearing assembly 118 to follow. The unseating of ball valve 124 exhausts transmission line pressure from conduit 52 to the reservoir of the automatic transmission 50. Referring to FIG. 1a, orifice 123 meters flow from conduit 52 so that the transmission line pressure is not adversely affected when ball valve 124 is unseated. The pressure decrease resulting from unseating of ball valve 124 causes the front modulator control valve 84 to control the front wheel brake pressure in the same manner that rear modulator control valve 46 controls the rear wheel brake pressure. The decreased pressure acting on the left end of valve spool 126 permits it to be moved by the modulator supporting pressure of conduit 128 acting on the differential area of spool 126 from the normal centered position shown in FIG. 1a to a leftward position exhausting the modulator supporting pressure from conduit 128 to the automatic transmission fluid reservoir. The resulting pressure decrease in conduit 128 and fluid pressure chamber 38 of the front brake pressure modulator 26 permits piston 36 to withdraw, seating ball check valve 40 and increasing the volume of conduit 22 to decrease the brake pressure at the front wheel brakes 18 and 20. Disk clutch assembly 116 slips allow the gear sleeve 96 to rotate faster than the clutch housing 114 while operation of the front wheel anti-lock system is initiated. When the front wheels have accelerated to a point where the rotating speed of cable 86, cam sleeve 104, and clutch housing 114, exceeds that of gear sleeve 96 which is driven by gear 94, the gear sleeve 96 is once again driven by the front wheel speed and thus overruns the gear 94 as permitted by one-way clutch 98. The spring 117 moves clutch housing 114 leftwardly when it is again driven by the front wheel speed. The valve lever 120 is simultaneously moved leftward to seat ball valve 124, thus blocking the communication of the transmission line pressure to the transmission reservoir. The resulting pressure increase in conduit 52 shifts valve spool 126 rightwardly to establish communication of the brake modulated steering fluid pressure in conduit 58 to the variable pressure chamber 38 of front brake pressure modulator 26. The brake modulated steering fluid pressure moves piston 36 to decrease the volume of conduit 22 and unseat ball check valve 40 to reestablish fluid communication between the master cylinder 10 and the front wheel brakes 18 and 20. As the pressure in conduit 128 increases, the leftward acting force on valve spool 126 increases and the spool moves leftwardly to the balanced center position of FIG. 1b.

Thus, the wheel speed comparator 82 compares the speed of the front vehicle wheels with that of the anti-lock controlled rear wheels and operates a brake fluid pressure modulator for the front wheels to prevent the front wheels from going slower than the rear wheels by more than a certain predetermined amount.

It is noted that while the wheel speed comparator 82 has herein been disclosed as used in conjunction with an inertial type deceleration sensor controlled rear wheel anti-lock system wherein the automatic transmission output shaft is used as a rear wheel speed input, the wheel speed comparator invention may be used in conjunction with any rear wheel anti-lock control system and the gear sleeve 96 may be driven in a variety of ways so as to provide a rear wheel speed input. While in this disclosure, the wheel speed comparator 82 has been advantageously housed in the transmission case, it is apparent that the wheel speed comparator may be more advantageously housed for use in conjunction with other types of rear wheel anti-lock control systems. Furthermore, while the present disclosure has included the use of a front wheel speed differential 88 and a single front brake pressure modulator, it is within the scope of this invention to provide separate wheel speed comparators driven respectively by each of the front wheels to provide individual control of separate front brake pressure modulators associated respectively with these front wheels. Additionally, any pump providing the necessary relatively high pressure and high flow rate may be used in place of the power steering pump to power the apply mode of the anti-lock cycle.

What is claimed is:

1. In a motor vehicle having fluid pressure operated wheel brakes and wheel anti-lock control means associated with at least one of the wheel brakes to prevent lockup thereof, the combination of:

a rotatable member;

first means driving said rotatable member at a speed proportional to that of the anti-lock controlled vehicle wheel and including clutch means permitting the rotatable member to overrun the first drive means and permitting the first drive means to overrun the rotatable member after transmitting at least some torque thereto;

second means driving said rotatable member at a speed proportional to that of another vehicle wheel and including cam means operable when some torque is transmitted to said rotatable member by said first driving means to cause axial movement of the rotatable member;

and means acting to modulate braking pressure to said another wheel in response to axial movement of the rotatable member;

said second means driving said rotatable member until wheel speed decrease of the another wheel and anti-lock control of the at least one associated wheel brake cause the first means to drive the rotatable member and transmit at least some torque thereto causing axial movement of the rotatable member and consequent operation of the fluid pressure modulator to modulate braking pressure to another wheel brake.

2. In a motor vehicle having fluid pressure operated wheel brakes and wheel anti-lock control means associated with at least one of the wheel brakes to prevent lockup thereof, the combination of:

a first rotatable member;

means rotating the first rotatable member at a speed proportional to the speed of the anti-lock controlled vehicle wheel and including one-way clutch means permitting said first rotatable member to overrun the speed of the anti-lock controlled set of vehicle wheels;

a second rotatable member;

means rotating the second rotatable member at a speed proportional to the speed of another vehicle wheel;

a third rotatable member;

axially expandable drive means acting between the second and third rotatable members to normally drive the third rotatable member at the speed of said another vehicle wheel, the drive means expanding and causing axial movement of the third rotatable member when the third rotatable member overruns the second rotatable member;

clutch means acting between the first and third rotatable members to normally drive the first rotatable member at the another wheel speed and permitting the first rotatable member to drive the third rotatable member and then to overrun the third rotatable member at a predetermined torque;

a fluid pressure modulator associated with the another wheel brake and being operable by axial movement of the third rotatable member to modulate the braking pressure to the another wheel brake;

upon application of excessive braking pressure to the wheel brakes causing impending wheel lockup, the wheel anti-lock control means associated with the at least one vehicle wheel brake acts to prevent lockup thereof by allowing wheel speed to increase, whereby the speed of the anti-lock controlled wheels exceeds that of the another wheel so that the first rotatable member and the third rotatable member are driven by the speed of the controlled vehicle wheel causing axial separation of said first and third rotatable members and consequent modulation of braking pressure to said another wheel.

3. In a motor vehicle having fluid pressure operated wheel brakes and wheel anti-lock control means associated with at least one of the wheel brakes to prevent lockup thereof, wheel speed comparator means to prevent lockup of at least another vehicle wheel brake and comprising:

a housing;

first and second rotatable members being axially fixed in said housing;

a third rotatable member being axially movable in the housing and located intermediate the first and second rotatable members;

means driving the first rotatable member at a speed proportional to that of the anti-lock controlled wheel;

means driving the second rotatable member at a speed proportional to that of another wheel;

drive means acting between the second and third rotatable members and permitting axial movement of the third rotatable member;

spring means defining a normal axial relationship between the second and third rotatable member;

clutch means drivingly connecting said first and third rotatable members;

cam means between the second and third rotatable members and moving said third rotatable member axially away from said second rotatable member when said third rotatable members drives said second member;

one-way clutch means acting between the first rotatable member and the wheel speed driving means associated therewith permitting unitary rotation of said first, second and third rotatable members by the means driving the third rotatable member at a speed overrunning the means driving the first rotatable member at a speed proportional to that of the anti-lock controlled wheel;

a fluid pressure operated modulator operable to control braking pressure to the another wheel to prevent lockup thereof;

and valve means shiftable by axial movement of said third rotatable member to operate the fluid pressure operated modulator;

said wheel anti-lock control means associated with at least one of the vehicle wheels acting to prevent lockup thereof upon application of excessive braking pressure thereto by allowing an increase in the speed thereof, whereby when the speed of the first rotatable member exceeds that of the third rotatable member, driving torque transmitted from said first rotatable member to said third rotatable member causes axial movement of said third rotatable member and consequent modulation of braking pressure to the other wheel;

and said clutch means being overcome to relieve driving torque transmitted from said first rotatable member to said third rotatable member in excess of that necessary to cause axial movement of said third rotatable member.

* * * * *